United States Patent [19]

Almond

[11] Patent Number: 5,744,750
[45] Date of Patent: Apr. 28, 1998

[54] MODULAR ELECTRICAL CONNECTOR BOX

[75] Inventor: Gordon S. Almond, Kelowna, Canada

[73] Assignee: R123 Enterprises Ltd., Kelowna, Canada

[21] Appl. No.: 348,279

[22] Filed: Nov. 30, 1994

[51] Int. Cl.$^6$ .................................................. H02G 3/10
[52] U.S. Cl. ............................. 174/49; 174/66; 220/3.8
[58] Field of Search ........................... 174/49, 53, 58, 174/66, 67; 220/3.6, 3.8, 3.94, 4.02, 3.92; 248/27.3, 27.1

[56] References Cited

U.S. PATENT DOCUMENTS

| | | | |
|---|---|---|---|
| 1,228,731 | 6/1917 | Abbott et al. | |
| 3,689,868 | 9/1972 | Snyder | 174/66 X |
| 3,895,179 | 7/1975 | Wyatt | 174/50 |
| 4,247,738 | 1/1981 | Bonato | 174/53 |
| 4,500,746 | 2/1985 | Meehan | 174/58 X |
| 4,609,235 | 9/1986 | Ventura | 312/330 R |
| 4,612,412 | 9/1986 | Johnston | 174/65 R |
| 4,733,330 | 3/1988 | Tanaka et al. | 174/58 X |
| 4,842,551 | 6/1989 | Heimann | 174/58 X |
| 4,857,669 | 8/1989 | Kitamura et al. | 174/53 |
| 4,998,635 | 3/1991 | Vink et al. | 248/27.1 X |
| 5,065,968 | 11/1991 | Kesler et al. | 174/58 X |
| 5,114,365 | 5/1992 | Thompson et al. | 174/66 X |
| 5,122,069 | 6/1992 | Brownlie et al. | 174/53 X |
| 5,178,350 | 1/1993 | Vink et al. | 220/3.8 X |
| 5,180,886 | 1/1993 | Dierenbach et al. | 174/66 |
| 5,189,259 | 2/1993 | Carson et al. | 174/66 |
| 5,455,388 | 10/1995 | Pratt | 174/67 |
| 5,457,286 | 10/1995 | Flasz | 174/66 |

FOREIGN PATENT DOCUMENTS

| | | | |
|---|---|---|---|
| 5207626 | 8/1993 | Japan | 174/49 X |

OTHER PUBLICATIONS

IBM Technical Disclosure Bulletin, vol. 20, No. 9, "Control Panel Configuration for Multiple Machine Models," Feb. 1978.

*Primary Examiner*—Kristine L. Kincaid
*Assistant Examiner*—Dean A. Reichard
*Attorney, Agent, or Firm*—George A. Seaby

[57] ABSTRACT

An assembly for housing electrical outlets includes a junction box for mounting in a recess in a wall or floor, a ring for mounting on the open top or outer end of the box, at least one pair of opposed recesses in the ring for receiving an electrical outlet, a cover plate for covering the area of the ring containing the outlet, and a face plate for surrounding the cover plate and limiting access thereto. The cover plate, face plate and the mounting ring have snap in locking systems. Notches in the mounting ring permit disengagement of the cover plate locking system using a lever. The notches are normally covered by the face plate. The assembly is easy to install, and discourages tampering.

6 Claims, 2 Drawing Sheets

FIG. 2
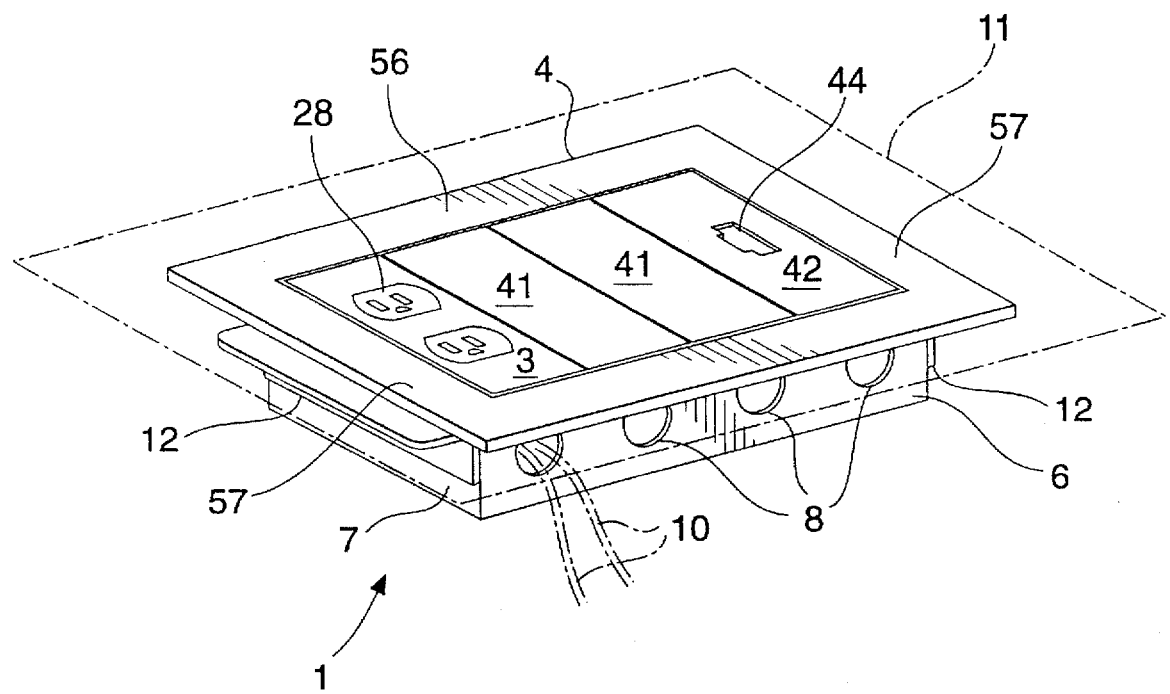
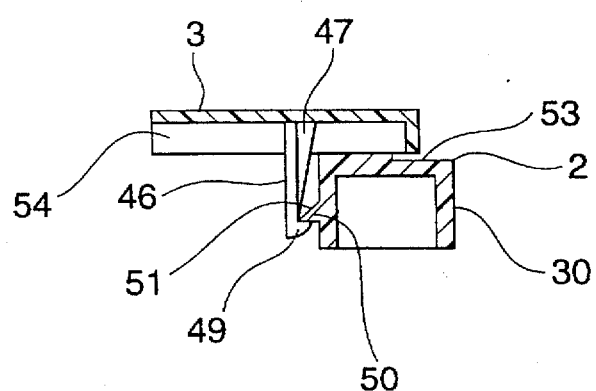
FIG. 3

MODULAR ELECTRICAL CONNECTOR BOX

FIELD OF THE INVENTION

This invention relates to an assembly for housing electrical outlets.

BACKGROUND OF THE INVENTION

In homes and offices, outlets for electrical power, data, video and voice communications are becoming more abundant to accommodate the increase in high technology equipment. Telephones, fax machines, modems and computers running alone or interconnected in a local or wide area network all require connections to power sources and communication lines in order to communicate with each other, with accessory equipment and with outside equipment.

In the past, each outlet to accommodate an electric power socket or a plug in location for cabling for data, video and voice communications was installed in an individual junction box mounted in the wall or floor, and appropriate cables hidden within the wall were run to the box for connection to an appropriate outlet. The box was covered by a plate secured by a screw to provide a neat finish. This arrangement has not proven to be particularly flexible, since a new hole must be made in the wall or floor to accommodate each new outlet.

In an attempt to provide greater flexibility, junction boxes have been developed to accommodate multiple outlets of various types in a single enclosure. This arrangement offers maximum flexibility and provides for ease of moving, expanding or rearranging outlets.

Examples of such multiple outlet junction boxes are found in U.S. Pat. Nos. 1,228,731, issued to Abbott et al; 4,247,738, issued to Bonato; 4,609,235, issued to Ventura; 4,733,330, issued to Tanaka et al; 4,857,669, issued to Kitamura et al; 5,122,069, issued to Brownlie et al and 5,178,350 issued to Vink et al.

A problem with of existing outlet designs is that it is often relatively easy to remove the cover plate and gain access to the interior of the box, because the screw in the cover plate is readily accessible. Therefore, unauthorized access to the outlets and tampering are difficult to control.

SUMMARY OF INVENTION

An object of the present invention is to provide a solution to the problem described above in the form of a relatively simple, tamper proof assembly for housing electrical outlets.

Another object of the invention is to provide an assembly for housing electrical outlets which not only discourages tampering, but also is relatively easy to install, and which provides a neat and clean appearance, displaying no external fasteners when assembled.

Accordingly, the present invention relates to an assembly for housing electrical outlets comprising junction box means for mounting in a recess in a wall, said box means having an open outer side;

ring means for mounting on said open outer side of the box means, said ring means permitting access to the interior of the box means;

at least one pair of opposed recesses in said ring means for receiving an electrical outlet;

cover plate means for extending between opposed sides of said ring means to cover the area of the ring means around the electrical outlet and in the area of said opposed recesses while permitting access to said electrical outlet;

first lock means for releasably locking the cover plate means on said ring means;

face plate means for mounting on said ring means in surrounding relationship to said cover plate means and forming a substantially continuous outer surface therewith when in an assembled condition, said face plate means limiting access to said cover plate means, whereby said cover plate means cannot be removed from said ring means until said face plate means has been removed therefrom; and second lock means for releasably locking said face plate means to said ring means.

The assembly described above can be used for a single outlet or multiple outlets. When designed for multiple outlets, any unused outlet mounting sites in the junction box can be covered by a blank cover plate.

BRIEF DESCRIPTION OF THE DRAWINGS

The invention is described below in greater detail with reference to the accompanying drawings, which illustrate a preferred embodiment of the invention, and wherein:

FIG. 2 is an isometric view of the assembly of FIG. 1 in the assembled condition; and FIG. 3 is a sectional view of a lock for a cover plate used in the assembly of FIGS. 1 and 2.

DESCRIPTION OF PREFERRED EMBODIMENT

Figure 1:
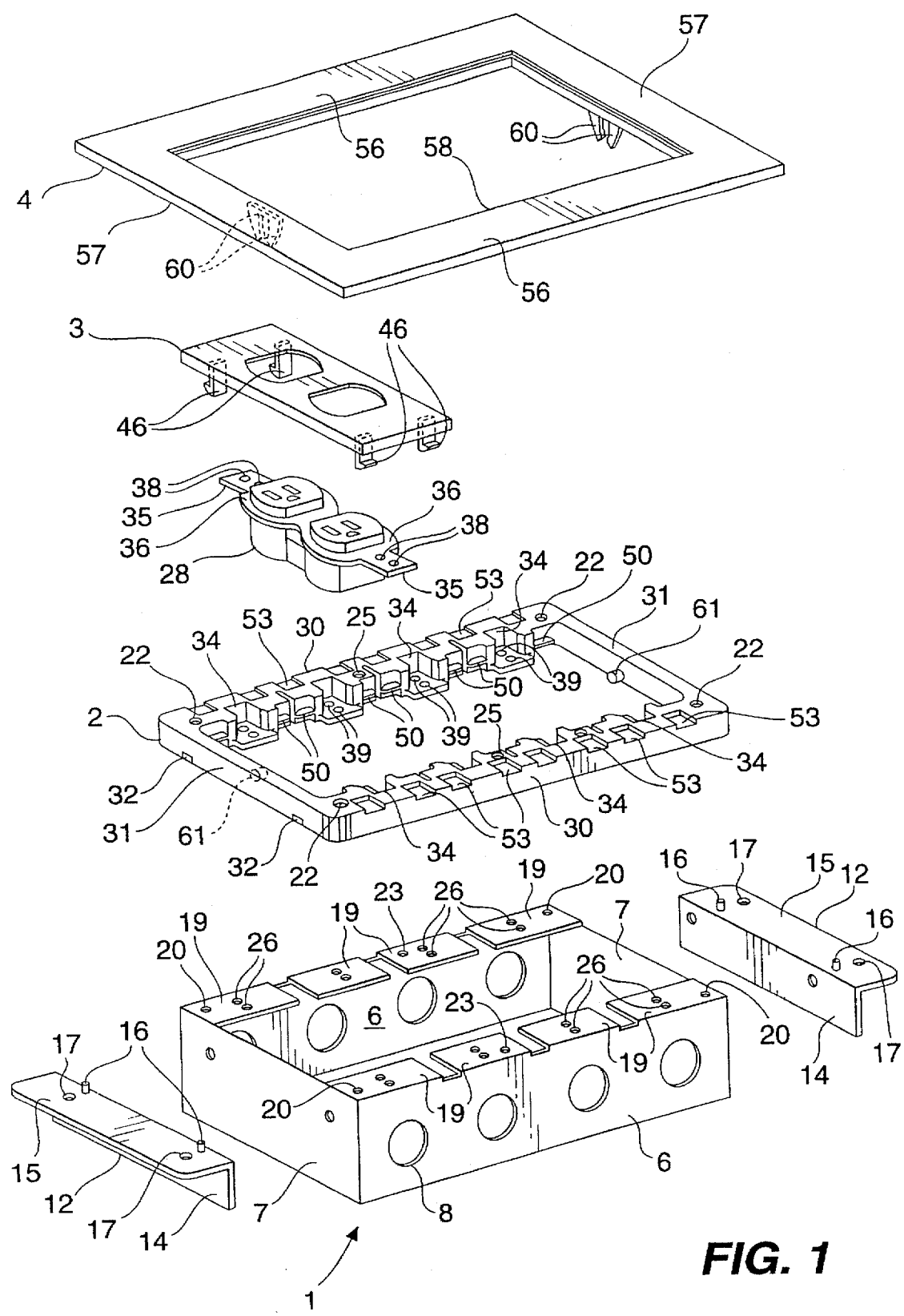
FIG. 1 is an exploded view of an assembly according to the present invention.

With reference to FIG. 1, the basic elements of the electrical outlet assembly of the present invention include a junction box generally indicated at 1, a mounting ring 2, a cover plate 3 and a face plate 4.

The junction box 1 is in the form of a hollow, rectangular body defined by side walls 6 and end walls 7. Knock outs 8 are provided in the side walls 6 for introducing wires 10 (FIG. 2) into the box 1. The box 1 is mounted in a recess (now shown) in a wall or floor 11 using a pair of brackets 12. Each of the brackets 12 is connected to one end wall 7 of the box 1. The other arm 15 of the bracket extends outwardly from the end wall 7 in the same plane as the open top or outer end of the box 1. Locating pins 16 extend upwardly from the arm 15 of the bracket 12. As described hereinafter in greater detail, the pins 16 are used to locate the mounting ring 2 on the box 1. Holes 17 in the arms 15 receive screws (not shown) for mounting the brackets 12 on frame members (not shown) in the wall or floor 11.

Mounting plates 19 extend inwardly from each of the side walls 6 of the box 1. Each of the plates 19 adjacent the ends 7 of the box 1 includes a corner hole 20 for receiving a screw (not shown) which passes through an aligned corner hole 22 in the ring 2 for connecting the latter to the box 1. Similarly, a hole 23 is provided in one of the middle plates 19 on each side of the box 1 for receiving a screw which passes through an aligned middle hole 25 in the ring 2. All of the plates 19 includes a pair of holes 26 aligned transversely with each other and with similar holes in an opposing plate 19 for receiving screws (not shown) used to connect electrical outlet receptacles 28 (one shown) to the box 1 and the ring 2.

As best shown in FIG. 1, the mounting ring 2 includes a molded plastic body defined by a pair of sides 30 and ends 31. As mentioned above, cover holes 22 and middle holes 25 are provided in the side 30 of the ring 2 for receiving screws, which connect the ring 2 to the box 1. A pair of notches 32 in each end 31 of the ring receive the pins 16 on the brackets 12 for properly locating the ring 2 on the box 1 and the brackets 12. Opposed, deep recesses 34 in the inner edges of the sides 30 receive mounting tabs or lugs 35 on the ends 36 of the electrical receptacle 28. Holes 38 in the lugs 35 are aligned with holes 39 in the bottom of each recess and with the holes 26 in the plates 19. Screws extend through the lugs 35 and the holes 39 into the holes 26 to securely mount the receptacle 28 in the ring 2 and on the box 1.

Once the receptacle 28 has been mounted in the ring 2, portions of the receptacle and of the ends 31 and/or sides 30 of the ring adjacent thereto are covered using the cover plate 3. Other cover plates 41 and 42 (FIG. 2) can also be used on the box 1 and the ring 2. The blank cover plate 41 is used to cover areas where no receptacle is mounted in the box 1 and ring 2, and the network connection cover plate 42 has an opening 44. Obviously, cover plates designed to receive telephone jacks (not shown) and other connectors are possible.

The cover plate 3 (and any other of the cover plates referred to above) have the appropriate openings or lack thereof, and a pair of spring fingers 46 extending downwardly from each end of the plate. The fingers 46 include triangular reinforcements or gussets 47, and hook-shaped bottom ends 49 (FIG. 3) for engaging ledges 50 extending inwardly from the sides 30 of the ring 2 on each side of each recess 34. The top edge 51 of each ledge 50 is inclined, so that as the finger 46 is pushed downwardly against the ledge 50, the finger 46 flexes inwardly. Once the bottom end 49 passes the ledge, the finger returns to the rest position with the hook engaging the ledge 50.

In order to remove a cover plate 3, 41 or 42, a flat lever (not shown) e.g. a screwdriver is inserted into a rectangular notch 53 (FIGS. 1 and 3) in the outer edge of the top of each side 30 of the ring 2. As best shown in FIG. 3, the cover plate 3 includes a flange 54 extending around the periphery thereof for abutting the top surface of the ring 2, when the cover plate is mounted on the ring. It will be appreciated that the notch 53 in the ring 2 can be complemented or replaced by a notch in the bottom edge of the flange 54.

Referring to FIGS. 1 and 2, the faceplate 4 includes sides 56 and ends 57 defining a central opening 58. A pair of spaced apart gripping fingers 60 extend downwardly from the center of each end 57 for engaging a short post 61 on the mounting ring 2. For such purpose, the outer free ends of the fingers 60 converge slightly to define a gap which is smaller than the diameter of the post 61. A post 61 extends inwardly from the center of each end 31 of the ring 2.

When the assembly is in use, the exposed portions thereof have a neat, clean appearance with screws or other features visible. The assembly discourages tampering. However, new outlets can be added to the assembly merely by removing the face plate and then the appropriate cover plates.

I claim:

1. An assembly for housing electrical outlets comprising
   junction box means for mounting in a recess in a wall, said box means having an open outer side;
   ring means for mounting on said open outer side of the box means, said ring means having two ends and permitting access to the interior of the box means when mounted thereon;
   at least one pair of opposed recesses in said ring means for receiving an electrical outlet;
   cover plate means having two ends for mounting on said ring means and extending between opposed sides of said ring means to cover the area of the ring means around the electrical outlet and in the area of said opposed recesses while permitting access to said electrical outlet;
   first lock means for releasably locking the cover plate means on said ring means;
   face plate means for mounting on said ring means in surrounding relationship to said cover plate means and forming a substantially continuous outer surface therewith when in an assembled condition, said face plate means having two ends and limiting access to said cover plate means, whereby said cover plate means cannot be removed from said ring means until said face plate means has been removed therefrom; and
   second lock means for releasably locking said face plate means to said ring means.

2. The assembly of claim 1, including bracket means for connection to opposed ends of said box means, and for mounting the box means in a recess in a wall; and pin means on said bracket means for ensuring proper positioning of said ring means on said box means.

3. The assembly of claim 1, wherein said first lock means includes ledge means in said ring means; resilient spring fingers on an inner surface of said cover plate means; and hook means on an outer free end of each of said fingers for engaging said ledge means when the cover plate means is mounted on said ring means.

4. The assembly of claim 3, wherein said second locking means includes two opposed gripping fingers extending outwardly from each end of said face plate means; and post means extending inwardly from each end of said ring means for being gripped by said gripping fingers when the face plate means is mounted on said ring means.

5. The assembly of claim 1, including notch means in an outer edge of one of said ring means and said cover plate means for facilitating removal of said cover plate means, said notch means being covered by said face plate means in the assembled condition and accessible only when said face plate means is removed from said ring means.

6. The assembly of claim 5, including a plurality of said notch means in said ring means, whereby at least one of said notch means is accessible at each end of said cover plate means when said face plate means is removed from the ring means.

* * * * *